UNITED STATES PATENT OFFICE 2,631,158

DIESTERARSENITEAMIDES

James R. Vaughan, Jr., Glenbrook, Conn., assignor to American Cyanamid Company, New York, N. Y., a corporation of Maine No Drawing. Application February 1, 1951,
Serial No. 208,986

18 Claims. (Cl. 260—440)

This invention relates to diesterarseniteamides and methods of preparing the same.

The new diesterarseniteamides of this invention, which are also referred to simply as aminoarsenites, may be illustrated by the following formula:

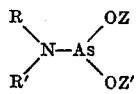

in which R is an organic radical attached to the nitrogen by a carbon to nitrogen linkage, R' is hydrogen or an organic radical attached to the nitrogen by a carbon to nitrogen linkage, and in which Z and Z' are the same or different esterifying radicals such as illustrated by the following: alkyl radicals of one to five carbon atoms, for instance ethyl, propyl and amyl; monocyclic aralkyl radicals, for instance benzyl. However, Z and Z' may also represent other types of radicals as the variation of these groups does not appreciably affect the chemical properties of the diesterarseniteamides.

The radicals represented by R and R' in the above formula may vary within wide limits as illustrated by the following examples: alkyl radicals, for instance ethyl, propyl, butyl, and octyl; alkyl radicals substituted by such substituents as chloro, acidamido, alkoxy and carboalkoxy; alkenyl radicals; for instance allyl; aromatic radicals, for instance phenyl and chlorophenyl; aralkyl radicals, for instance benzyl; cycloaliphatic radicals, for instance cyclohexyl. Also, R and R' may, together with the nitrogen atom, represent a heterocyclic radical, for instance piperidyl or 4-morpholinyl. However, compounds in which both R and R' are aromatic cannot readily be prepared and if, for instance, R is aromatic, R' must be hydrogen or a substituent of one of the other types listed above. Other examples of radicals which may suitably be represented by R and R' will become apparent to those skilled in the art when the process of making the new compounds is described.

Generally speaking, the compounds of this invention are obtained as oils or waxy liquids, soluble in most organic solvents. They react with water to give arsenic trioxide and with alcohols to give esters of arsenous acid.

The new compounds of this invention are useful in many fields. For instance, the new compounds offer an oil soluble source of arsenic trioxide and are therefore useful as rodenticides. The new compounds are also useful in organic synthesis and are valuable intermediates for the preparation of amides as disclosed in my copending U. S. application S. N. 208,937. It is intended, however, that this invention cover the new compounds per se and it is not to be construed as being limited to any particular field or fields of utility.

While it is not intended that this invention be limited to aminoarsenites prepared by any specific process, a particularly convenient method of preparing the new compounds has been discovered and this new method also constitutes a part of this invention.

The new method comprises reacting a haloarsenite with an amine as illustrated by the the following general equation:

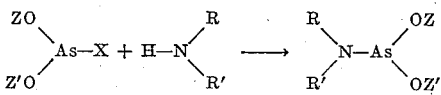

in which X represents halogen and R, R', Z and Z' are as defined above. The haloarsenites, which may also be referred to as diesters of arsenous halides, are known compounds and can be prepared by known methods. Because of the ease of preparation and their advantageous reaction velocity, the chloroarsenites are preferred.

Any amine is suitable for the process of this invention provided it has amine hydrogen and has a dissociation constant at 25° C. greater than $1 \times 10^{-13}$. Suitable amines may be illustrated by the following: primary aliphatic amines, for instance methylamine, ethylamine, propylamine, butylamine, hexylamine and allylamine; secondary aliphatic amines, for instance dimethylamine and dibutylamine; substituted aliphatic amines, for instance chloroethylamine, phenethylamines and benzylamine; aromatic amines, for instance aniline and naphthylamine; substituted aromatic amines, for instance m-toluidine and p-benzylaniline; secondary mixed aliphatic-aromatic amines, for instance N-allylaniline, and benzylaniline; cyclic amines, for instances piperidine, and morpholine; heterocyclic amines, for instance aminopyrimidine; diamines, for instance butylene diamine, and diethylenediamine. Amines which are unsuitable are those having a dissociation constant at 25° C less than $1 \times 10^{-13}$, for instance diphenyl amine or other secondary aromatic amines.

The reaction is conveniently performed in an inert solvent. Examples of suitable solvents are: benzene, toluene, xylene or other aromatic hydrocarbons; chloroform or other halogenated aliphatics; normal octane or other aliphatic hydrocarbons; cyclohexane or other alicyclic hydrocarbon solvents; ethyl acetate or other of the lower aliphatic esters; ethyl ether or other lower aliphatic ethers; methyl butyl ketone or other lower aliphatic ketones; dioxane or other cyclic ethers; etc. Choice of solvent will depend principally upon convenience, but as the new class of compounds are useful as intermediates, in many instances they may be utilized without isolation from the solvent and in such instances the intended use will affect the choice of solvent.

As halogen acid is formed during the reaction which tends to react with the free amine reactant, it is usually advantageous to have a halogen acid acceptor present in the reaction mixture. The preferred halogen acid acceptors are the tertiary amines such as triethylamine, tributylamine and the like.

The reaction proceeds readily at room temperature or at any other temperature below the decomposition temperature of the reaction product; however, as a matter of convenience one is usually limited to a range between the freezing and reflux temperatures of the solvent employed. Temperatures between 0° C. and 50° C. are preferred.

The reaction proceeds immediately upon mixing the two reactants as is evidenced, when a tertiary amine is present as a halogen acid acceptor, by a precipitate of amine hydrochloride. Even at very low temperatures, i. e., 0° C., the reaction is substantially complete in a very few minutes.

The new compounds of this invention are of particular interest for use as intermediates when prepared from esters or amides of the naturally occurring aminoacids as such compounds are of great value in peptide synthesis. Illustrative of such naturally occurring aminoacids are the following: alanine, valine, norvaline, leucine, norleucine, isoleucine, phenylalanine, tyrosine, serine, cysteine, methionine, aspartic acid, glutamic acid, lysine, ornithine, asparagine, citrulline, histidine, and tryptophane. Generally speaking, the naturally occurring aminoacids such as the above are alpha aminoacids having from two to twelve carbon atoms.

The invention will be more fully illustrated by the following specific examples in which all parts are by weight unless otherwise indicated:

*Example I*

To a solution of 1.86 parts by weight of aniline and 2.04 parts by weight of triethylamine in 50 parts by volume of toluene there is added 4.01 parts by weight of chlorodiethylarsenite (J. C. S. 117, 406). An exothermic reaction occurs and a quantitative yield of triethylamine hydrochloride is immediately precipitated. Concentration of the toluene filtrate by vacuum distillation gives anilinodiethylarsenite as a light yellow oil.

In place of the chlorodiethylarsenite in the above example, bromodiethylarsenite may be employed with good results. Likewise, other chloroarsenites, for instance chlorodiamylarsenite, chlorodipropylarsenite and chlorodibenzylarsenite may be employed in place of the chlorodiethylarsenite above to produce other diesterarseniteamides of aniline having practically the same chemical properties as anilinodiethylarsenite.

*Example II*

To a solution of 4.59 parts by weight of ethyl dl-phenylalanate hydrochloride and 4.08 parts by weight of triethylamine in 50 parts by volume of chloroform there is added 50 parts by volume of ether. The resulting precipitate of triethylamine hydrochloride is removed by filtration and to the resulting clear, ether-chloroform solution there is added a solution of 4.01 parts by weight of chlorodiethylarsenite in 10 parts by volume of ether. After about ten minutes the solution is again filtered to remove triethylamine hydrochloride. Concentration of the clear filtrate by vacuum distillation gives diethyl-alpha-carbethoxy-beta-phenylethylaminoarsenite as a yellow oil.

*Example III*

In about 35 parts by volume of chloroform there is dissolved 3.65 parts by weight of ethyl dl-valinate hydrochloride and 4.1 parts by weight of triethylamine. The solution is then diluted with 75 parts by volume of toluene and the resulting precipitate of triethylamine hydrochloride removed by filtration. To the toluene filtrate there is added 4.0 parts by weight of chlorodiethylarsenite and the mixture heated under reflux for about ten minutes. After cooling, the mixture is again filtered to remove triethylamine hydrochloride. The diethyl-alpha-carbethoxy-secondary-butylaminoarsenite is obtained from the clear filtrate by vacuum distillation of the toluene solvent.

*Example IV*

To a solution of 4.08 parts by weight of triethylamine and 60 parts by volume of dry toluene there is added 4.91 parts by weight of ethyl L-tyrosinate hydrochloride and the mixture gently warmed for about ten minutes. To this there is added a solution of 4.01 parts by weight of chlorodiethylarsenite in 10 parts by weight of toluene with stirring. After about fifteen minutes the precipitated triethylamine hydrochloride is removed by filtration leaving a clear solution of L-diethyl-alpha-carbethoxy-beta-(p-hydroxyphenyl)ethylaminoarsenite. If desired, the aminoarsenite can be isolated as an oil by vacuum distillation of the solvent, or the aminoarsenite can be used in subsequent reactions without isolation.

Other aminoarsenites may be prepared by the same procedure by employing an equal molar quantity of the appropriate primary or secondary amine in place of the 1-tyrosinate of the above example.

*Example V*

To a solution of 0.87 part by weight of morpholine and 1.02 parts by weight of triethylamine in about 75 parts by volume of dry toluene there is added portionwise 2.0 parts by weight of chlorodiethylarsenite. After about ten minutes the reaction mixture is cooled and the precipitate of triethylamine hydrochloride removed by filtration leaving a clear solution of diethylmorpholinoarsenite. If desired, the aminoarsenite can be isolated as an oil by vacuum distillation of the solvent, or the aminoarsenite can be used in subsequent reactions without isolation.

*Example VI*

To a solution of 4.08 parts by weight of triethylamine in 75 parts by volume of toluene there is added 5.72 parts by weight of ethyl glycyl-dl-phenylalanate hydrochloride and the mixture warmed until salt formation is complete. To this there is added a solution of 4.01 parts by weight of diethylchloroarsenite in 10 parts by volume of toluene and the precipitate of triethylamine hydrochloride removed by filtration leaving a clear solution of the diethylarseniteamide of ethyl glycyl-phenylalanate which may be represented by the formula:

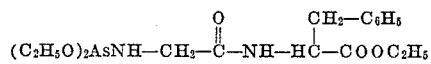

The arseniteamide can be obtained as an oil by evaporation of the solvent in vacuo or the arseniteamide can be employed in subsequent reactions without isolation.

I claim:

1. Diesterarseniteamides represented by the formula:

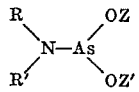

in which Z and Z' represent hydrocarbon esterifying radicals and in which

represents a substituted amino radical other than an amino radical substituted by two aromatic radicals.

2. Diethylanilinoarsenite.

3. Diesterarseniteamides of aminoacid esters represented by the formula:

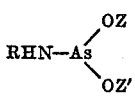

in which Z and Z' represent alkyl esterifying radicals and RHN— represents a substituted amino radical having a carboxylic ester group.

4. Diethyl-alpha-carbethoxy-beta-phenylethylaminoarsenite.

5. Diethyl-alpha-carbethoxy-secondary-butylaminoarsenite.

6. Diesterarseniteamides of optically active aminoacid esters represented by the formula:

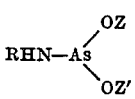

in which Z and Z' represent alkyl esterifying radicals and RHN— represents a substituted amino radical, said substituted amino radical having a carboxylic ester group attached to an asymmetric carbon atom.

7. L-diethyl-alpha-carbethoxy-beta(p-hydroxyphenyl) ethylaminoarsenite.

8. Diesterarseniteamides of aminoacid amides represented by the formula:

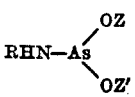

in which Z and Z' represent alkyl esterifying radicals and RHN— represents a substituted amino radical having a carboxylic amide group.

9. Diesterarseniteamides of peptide esters represented by the formula:

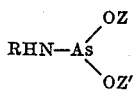

in which Z and Z' represent alkyl esterifying radicals and RHN— represents a substituted amino radical the substituent of which has at least one peptide linkage and a carboxylic ester group.

10. The diethylarseniteamide of ethyl glycylphenylalanate.

11. A method of preparing diesterarseniteamides which comprises reacting an amine having amine hydrogen and having at 25° C. a dissociation constant greater than $1 \times 10^{-13}$, with a diester of an arsenous acid halide represented by the formula:

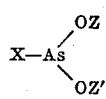

in which X represents halogen and Z and Z' represent hydrocarbon esterifying radicals.

12. The method of claim 11 when said amine is an aminoacid ester and said diester of arsenous halide is diethylchloroarsenite.

13. The method of claim 11 when said amine is a peptide ester and said diester of arsenous halide is diethylchloroarsenite.

14. A method of preparing diethylanilinoarsenite which comprises reacting, in an inert solvent at a temperature of 0–110° C. and in the presence of a tertiary amine, diethylchloroarsenite with aniline.

15. A method of preparing diethyl-alpha-carbethoxy-beta-phenylethylaminoarsenite which comprises reacting, in an inert solvent at a temperature of 0–110° C. and in the presence of a tertiary amine, diethylchloroarsenite with ethyl phenylalanate.

16. A method of preparing diethyl-alpha-carbethoxy-secondary-butylaminoarsenite which comprises reacting, in an inert solvent at a temperature of 0–110° C. and in the presence of a tertiary amine, diethylchloroarsenite with ethyl valinate.

17. A method of preparing L-diethyl-alpha-carbethoxy-beta(p-hydroxyphenyl)ethyl-aminoarsenite which comprises reacting, in an inert solvent at a temperature of 0–110° C. and in the presence of a tertiary amine, diethylchloroarsenite with ethyl L-tyrosinate.

18. A method of preparing the diethylarseniteamide of ethyl glycylphenylalanate which comprises reacting, in an inert solvent at a temperature of 0–110° C. and in the presence of a tertiary amine, diethylchloroarsenite with ethyl glycylphenylalanate.

JAMES R. VAUGHAN, Jr.

REFERENCES CITED

The following references are of record in the file of this patent:

Doak: Jour. Am. Pharm. Assoc., vol. 24, pages 453–456.